US008655019B2

(12) United States Patent  
Kamiyama (10) Patent No.: US 8,655,019 B2  
(45) Date of Patent: Feb. 18, 2014

(54) DRIVING SUPPORT DISPLAY DEVICE (75) Inventor: Hirotaka Kamiyama, Kanagawa (JP)

(73) Assignee: Panasonic Corporation, Osaka (JP)

( * ) Notice: Subject to any disclaimer, the term of this patent is extended or adjusted under 35 U.S.C. 154(b) by 5 days.

(21) Appl. No.: 13/496,267

(22) PCT Filed: Sep. 24, 2010

(86) PCT No.: PCT/JP2010/005778
§ 371 (c)(1),
(2), (4) Date: Mar. 15, 2012

(87) PCT Pub. No.: WO2011/036892
PCT Pub. Date: Mar. 31, 2011

(65) Prior Publication Data
US 2012/0170812 A1    Jul. 5, 2012

(30) Foreign Application Priority Data
Sep. 24, 2009  (JP) ................................ 2009-218445

(51) Int. Cl.
*G06K 9/00*  (2006.01)
(52) U.S. Cl.
USPC ........... 382/103; 382/104; 382/284; 382/107; 348/148; 348/187
(58) Field of Classification Search
USPC ................... 382/103, 104, 284; 348/148, 187
See application file for complete search history.

(56) References Cited

U.S. PATENT DOCUMENTS

| | | | | |
|---|---|---|---|---|
| 5,461,357 A | * | 10/1995 | Yoshioka et al. | 340/435 |
| 2008/0186382 A1 | * | 8/2008 | Tauchi et al. | 348/148 |
| 2008/0205706 A1 | * | 8/2008 | Hongo | 382/104 |
| 2009/0015675 A1 | * | 1/2009 | Yang | 348/148 |
| 2009/0022423 A1 | * | 1/2009 | Ehlgen et al. | 382/284 |

(Continued)

FOREIGN PATENT DOCUMENTS

| | | | |
|---|---|---|---|
| JP | 2007-104373 A | | 4/2007 |
| JP | 2007104373 | * | 4/2007 |

(Continued)

OTHER PUBLICATIONS

International Search Report for PCT/JP2010/005778 dated Dec. 28, 2010.

*Primary Examiner* — Stephen R Koziol
*Assistant Examiner* — Shaghayegh Azima
(74) *Attorney, Agent, or Firm* — Pearne & Gordon LLP (57) ABSTRACT

Disclosed is a driving support display device that composites and displays images acquired from a plurality of cameras, whereby images which are easy for the user to understand and which are accurate in the areas near the borders of partial images are provided. An image composition unit (41) formulates a bird's eye perspective image on the basis of a mapping table reference unit (45) using images of the area around the vehicle acquired from a plurality of cameras (31). An obstacle detection unit (42) detects obstacles in the images acquired by the plurality of cameras (31). On the basis of the obstacle information detected by the obstacle detection unit (42), an obstacle trajectory prediction unit (43) predicts the trajectory of the obstacle and determines the borders so that the borders of the obstacle and the composite image from the plurality of cameras (31) do not overlap. The image composition unit (41) acquires necessary information from the mapping table reference unit (45) and creates a bird's eye perspective image in which the borders of the obstacle and the images from the plurality of cameras do not overlap.

3 Claims, 13 Drawing Sheets

(56) References Cited

U.S. PATENT DOCUMENTS

| | | | |
|---|---|---|---|
| 2009/0237269 A1* | 9/2009 | Okugi et al. | 340/901 |
| 2009/0268027 A1* | 10/2009 | Yang | 348/148 |
| 2010/0171828 A1* | 7/2010 | Ishii | 348/135 |
| 2010/0245574 A1* | 9/2010 | Imanishi et al. | 348/148 |
| 2012/0140073 A1* | 6/2012 | Ohta et al. | 348/148 |

FOREIGN PATENT DOCUMENTS

| | | |
|---|---|---|
| JP | 2007-180720 A | 7/2007 |
| JP | 2007-251880 A | 9/2007 |
| JP | 2010-250640 A | 11/2010 |
| WO | 2010119734 A1 | 10/2010 |

* cited by examiner

FIG.1

PRIOR ART

FIG.2

PRIOR ART

| TIME | COORDINATES |
|------|-------------|
| 1 | (x1,y1) |
| 2 | (x2,y2) |
| 3 | (x3,y3) |
| . | |
| . . . | |
| | |
| t-1 | (xt1,yt1) |
| t | (xt,yt) |

DRIVING SUPPORT DISPLAY DEVICE

TECHNICAL FIELD

The present invention relates to a driving support display apparatus using a plurality of cameras that image the area around a vehicle, and more particularly to a driving support display apparatus that combines a bird's-eye-view image of the area around a vehicle from images captured by a plurality of cameras.

BACKGROUND ART

In recent years, driving support display apparatuses that display a bird's-eye-view image giving a downward view of the area around a vehicle from a virtual viewpoint above the vehicle on a monitor have become increasingly popular. Many driving support display apparatuses generate a bird's-eye-view image using a plurality of cameras in order to cover a wide monitoring range.

Figure 1:
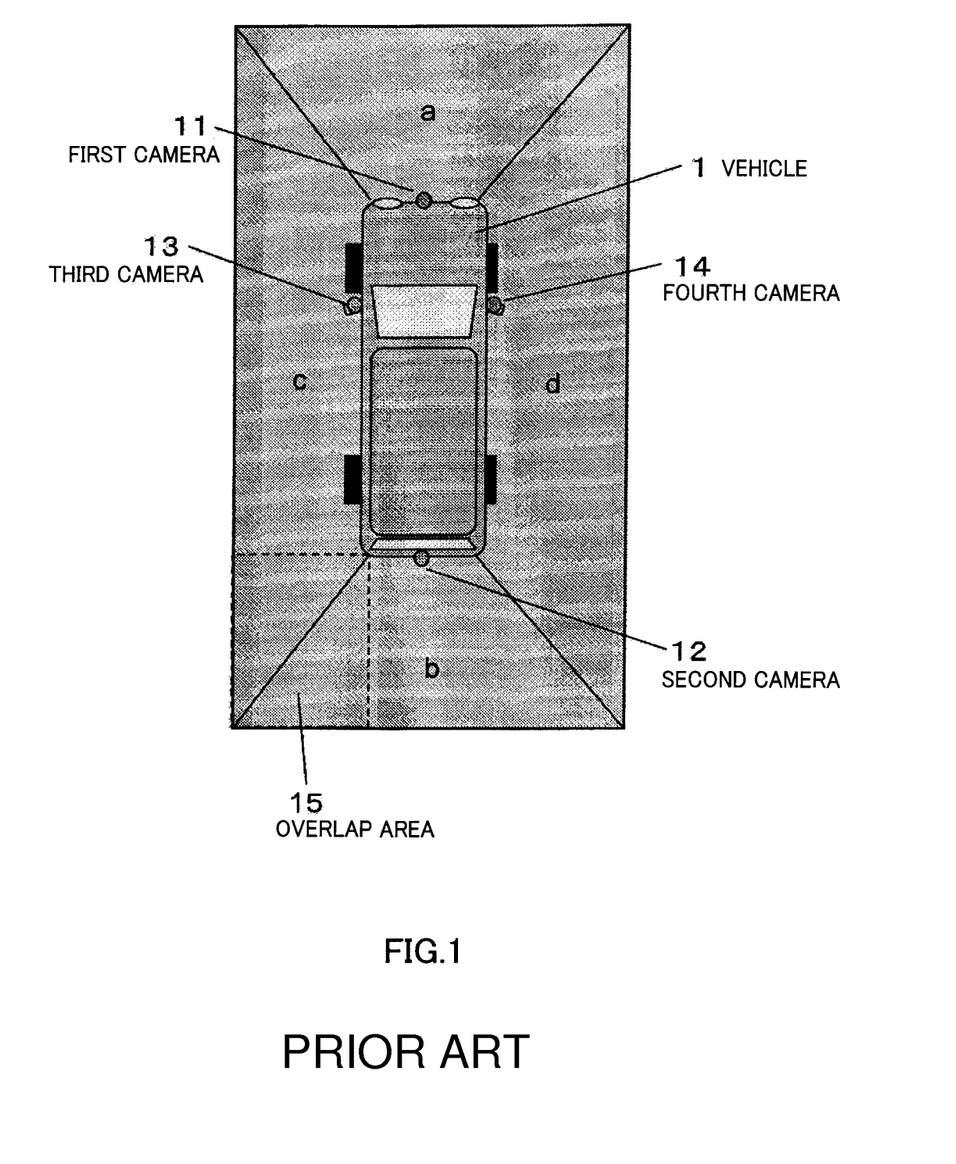
FIG. 1 is a drawing showing a camera arrangement in a conventional driving support display apparatus and a bird's-eye-view image obtained from images captured by the cameras.

FIG. 1 is a drawing showing a camera arrangement in a driving support display apparatus and a bird's-eye-view image obtained from images captured by the cameras.

As shown in FIG. 1, first through fourth cameras 11 through 14 are installed on vehicle 1. First through fourth cameras 11 through 14 image the road surface ahead of, behind, to the left of, and to the right of, vehicle 1, in diagonally downward directions. From captured images of first through fourth cameras 11 through 14, first through fourth camera bird's-eye-view images a through d approximating an image when looking down from a virtual viewpoint above the vehicle can be obtained.

It is desirable for a displayed bird's-eye-view image to be an image that is continuous over as wide a range as possible. Thus, provision is made for one bird's-eye-view image to be combined from captured images of a plurality of cameras. Below, a bird's-eye-view combined from captured images of a plurality of cameras is referred to as a "combined bird's-eye-view image."

Here, an area that can be imaged by two neighboring cameras is referred to as overlap area 15. The position of an image of a pattern without height on the road surface such as a road marking or tree shadow in overlap area 15 coincides in overlap area 15 for second camera 12 and third camera 13. However, the position of an obstacle located in an overlap area differs for respective second camera 12 and third camera 13 bird's-eye-view images due to the fact that the obstacle has height.

Figure 2:
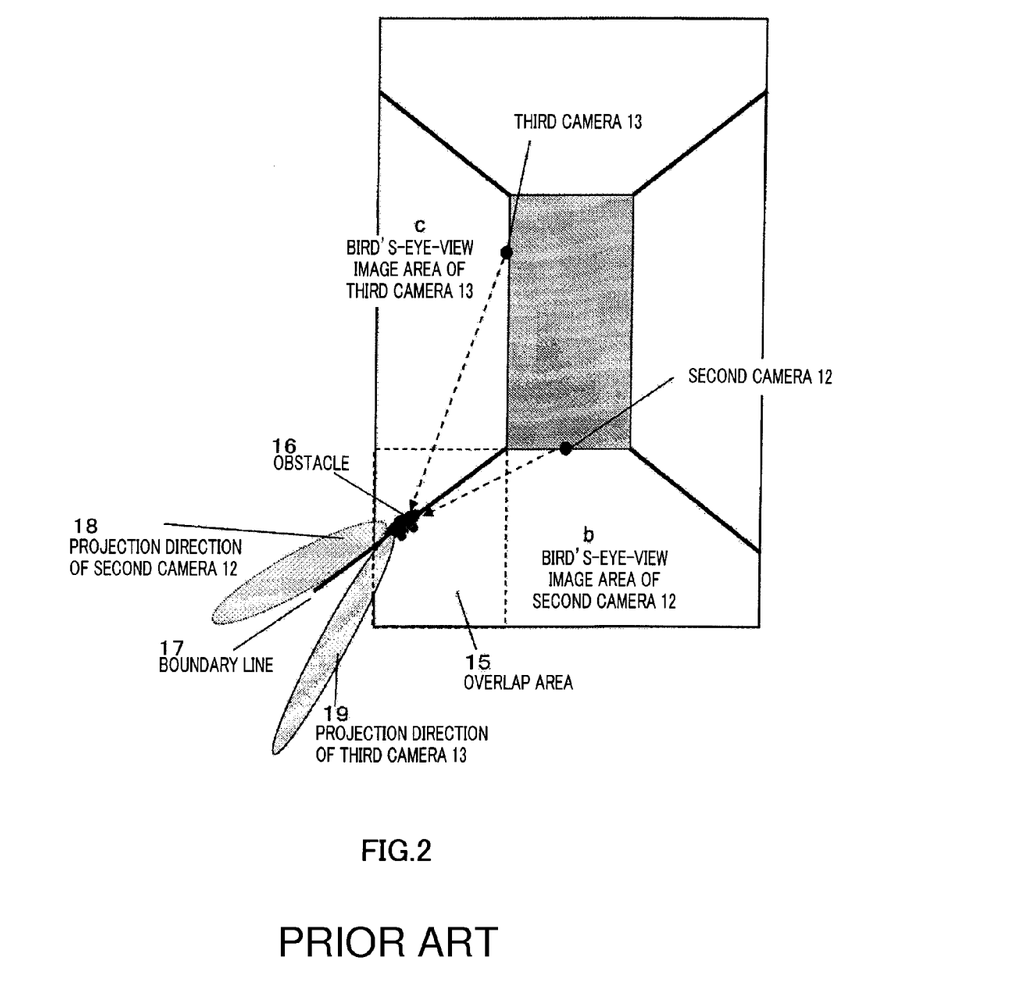
FIG. 2 is a drawing explaining the fact that an obstacle disappears at a boundary line of partial images in the case of a conventional driving support display apparatus.

This point will be explained using FIG. 2. FIG. 2 is a drawing explaining the fact that an obstacle disappears at a boundary line. This is because projection direction 18 of an obstacle when viewed from second camera 12 is different from projection direction 19 of the obstacle when viewed from third camera 13.

Thus, the direction of foreshortening (projection direction) of an obstacle in overlap area 15 differs for each bird's-eye-view image of each camera. When a camera image is delimited by a boundary line as in FIG. 2 in overlap area 15, bird's-eye-view image area b generates a bird's-eye-view image using a second camera 12 image. Similarly, bird's-eye-view image area c generates a bird's-eye-view image using a third camera 13 image. Consequently, obstacle 16 present in the vicinity of a boundary line is not displayed in either a second camera 12 bird's-eye-view image or a third camera 13 bird's-eye-view image.

There is consequently a problem in that, when a boundary and an obstacle overlap, the obstacle disappears, and the obstacle is not visible to a user.

Figure 3A:
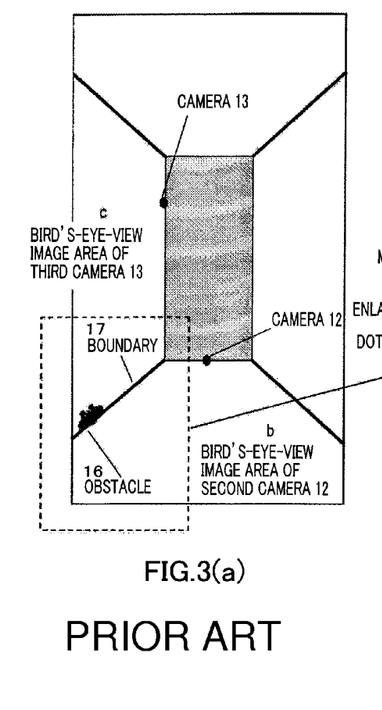
FIG. 3 is a drawing showing a partial image boundary line setting an example in the case of a conventional driving support display apparatus.
Figure 3B:
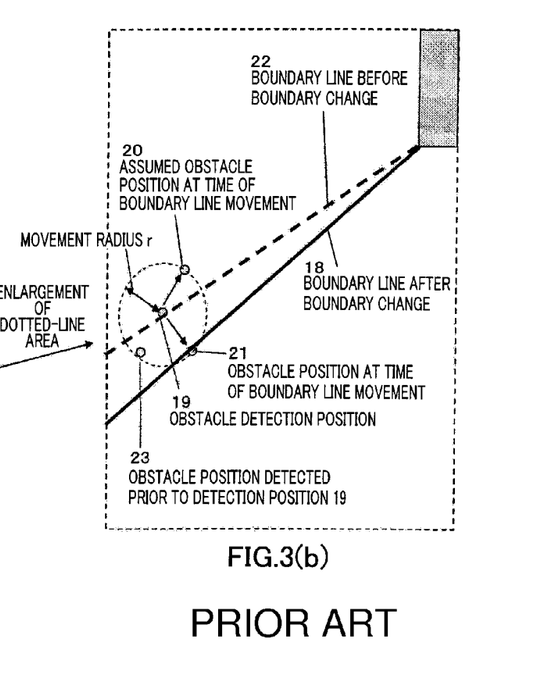

An apparatus disclosed in Patent Literature 1, for example, is known as a driving support display apparatus that solves this problem. FIG. 3 is a drawing for explaining Patent Literature 1. In Patent Literature 1, when display of obstacle 16 overlaps boundary 17 of composite images as in FIG. 3 (a), the boundary is changed so that the display of obstacle 16 does not overlap boundary 17 and an image with boundary 18 is displayed as in FIG. 3 (b).

CITATION LIST

Patent Literature

PTL 1
Patent 2007-104373

SUMMARY OF INVENTION

Technical Problem

However, while Patent Literature 1 discloses that, when there is an approaching obstacle, priority may be given to performing processing such that a boundary line does not fall on the approaching obstacle, actual processing contents are not disclosed, and therefore it may not necessarily be possible to set a boundary line so as not to fall on a moving obstacle.

This is explained below.

As shown in FIG. 3 (b), even if the movement direction is known at detection position 19 at which obstacle 16 is detected, if averaging is not performed using information of a plurality of frames, the direction and movement velocity cannot be detected correctly.

For example, moving obstacle 16 may suddenly change direction or velocity. In FIG. 3, obstacle 16 moving at a certain velocity is detected at certain timing. The position of an obstacle detected prior to detection position 19 detected at this detection timing is assumed to be obstacle position 23. When moving in a movement direction from obstacle position 23 to detection position 19, and at the movement velocity, obstacle 16 can be predicted to be at position 20 at the timing at which the boundary line is updated. If the movement velocity is designated Vo, the obstacle detection time to, and the boundary line update time tn, movement radius r can be defined as shown below.

$$r = Vo \times (to + tn)$$

However, the movement direction and movement velocity of an obstacle need not necessarily be constant, and there is a possibility of the obstacle being at obstacle position 21 at a certain time. That is to say, as the range in which an obstacle moves, movement may be performed to a position distant by movement radius r in a frame in which the next boundary line is updated based on the velocity of movement. In such a case, if a moving obstacle is simply detected, there is actually a risk of a boundary line falling on the obstacle. That is to say, there is a possibility of obstacle position 21 overlapping post-change boundary line 18.

Consequently, if a moving obstacle is simply detected, it may not necessarily be possible to set a boundary line so as to avoid a moving obstacle. Thus, in the invention disclosed in Patent Literature 1, there is a problem of not being able to change a boundary line so as to avoid a moving obstacle.

It is an object of the present invention to provide a user with an image that is accurate and easy to understand, and in which an obstacle does not disappear even in the vicinity of a boundary line between partial images, with a driving support display apparatus that combines and displays images captured by a plurality of cameras.

Solution to Problem

A driving support display apparatus of the present invention is provided with an obstacle movement direction prediction section that sets a boundary of images of a plurality of cameras so as not to overlap an obstacle, wherein an image combining section creates a bird's-eye-view image in which an obstacle and a boundary of images of the plurality of cameras do not overlap based on information from the obstacle movement direction prediction section.

Advantageous Effects of Invention

According to the present invention, by creating a bird's-eye-view image in which an obstacle and a boundary of images of a plurality of cameras do not overlap based on information from an obstacle movement direction prediction section, even in the case of a moving obstacle, a display does not overlap a boundary of images of a plurality of cameras. Therefore, information on the area around a vehicle can be conveyed to a driver accurately, and safer driving can be supported.

DESCRIPTION OF EMBODIMENTS

Now, driving support display apparatuses of embodiments of the present invention will be described with reference to the accompanying drawings.

(Embodiment 1)

Figure 4:
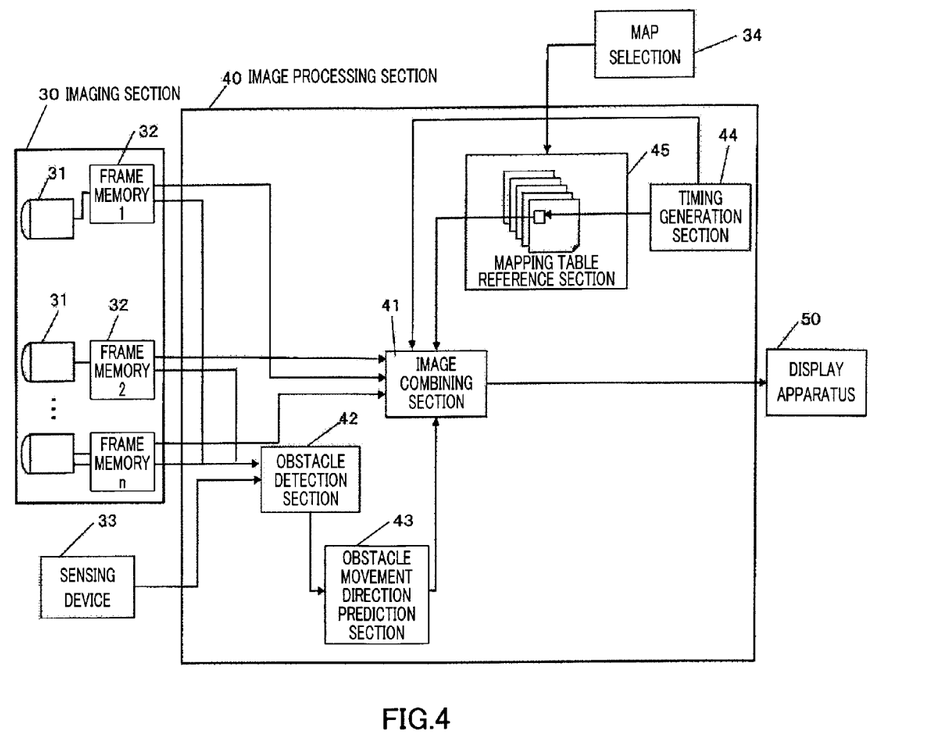
FIG. 4 is a block diagram of a driving support display apparatus according to Embodiment 1 of the present invention.

FIG. 4 is a block diagram showing the configuration of a driving support display apparatus according to Embodiment 1 of the present invention.

In the driving support display apparatus shown in FIG. 4, imaging section 30 comprises a plurality of cameras 31, and frame memories 32 that store images captured by cameras 31 on a frame-by-frame basis. Imaging section 30 typically has color or monochrome digital cameras 31 having a solid-state imaging element such as a CCD or CMOS device.

In image processing section 40, image combining section 41 inputs a plurality of camera images output from imaging section 30 having plurality of cameras 31, and processes these captured images. "Processing" here is image clipping and deforming processing, and processing that combines deformed partial images (including boundary processing). Pixel combining section 41 generates a composite image using a plurality of camera images output from imaging section 30 in accordance with mapping table MPT set after mapping table reference section 45 performs map selection 34, and outputs the generated composite image to display apparatus 50. Mapping table MPT is a table containing a correspondence relationship between composite image pixels and pixel data of each camera image, and is used to perform composite image generation processing at high speed. Creating this mapping table beforehand by means of calculation using geometric transformation described later herein or the like, or manual work or such, enables a desired composite image to be generated at high speed.

With a plurality of camera images input from imaging section 30 as input, obstacle detection section 42 performs ground/non-ground determination using the camera images, detects an obstacle standing on the ground, and outputs the position of such an obstacle. This obstacle detection method using camera images will be described in detail later herein. Output results of ultrasonic wave, millimeter wave, or such-like sensing device 33 may also be used for obstacle detection. Obstacle movement direction prediction section 43 predicts a movement direction using a past position from a position of an object detected by obstacle detection section 42, sets a partial image boundary, and outputs this to image combining section 41. Timing generation section 44 generates a timing signal for generating a composite image moving image sequence, and outputs this to mapping table reference section 45.

Figure 5:
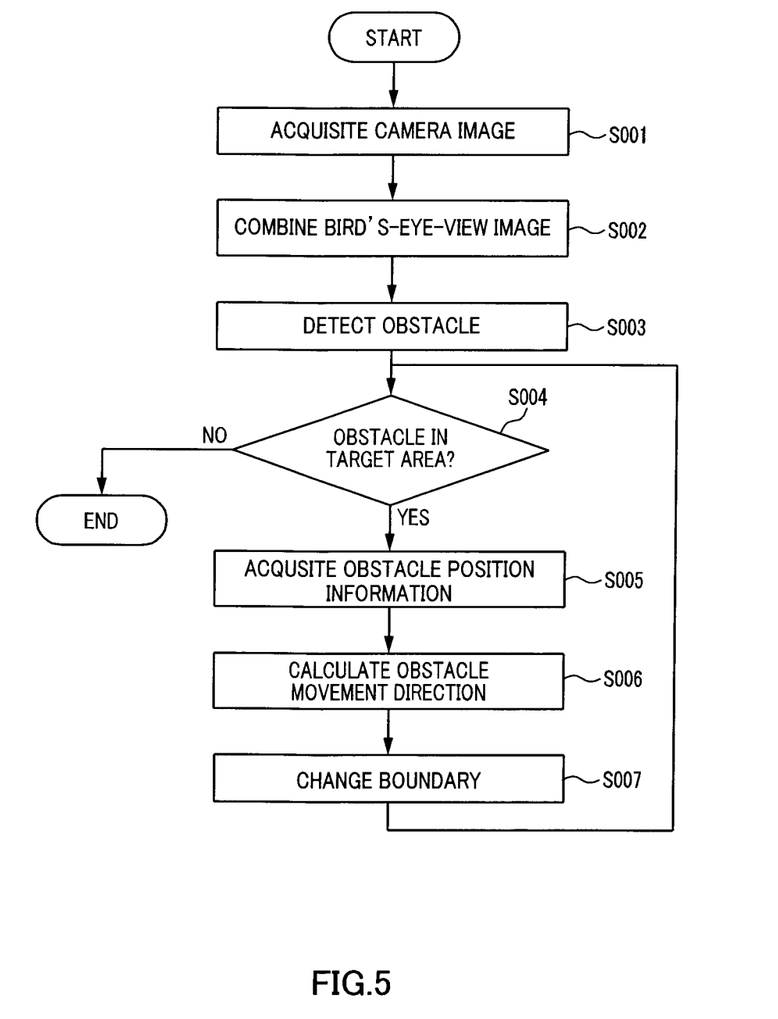
FIG. 5 is a flowchart for explaining the operation of the above apparatus.

The operation of a driving support display apparatus configured as described above will now be explained with reference to the accompanying drawings. FIG. 5 is a flowchart showing the operation of this driving support display apparatus.

In step S001, camera images from plurality of cameras 31 in imaging section 30 are acquired.

In step S002, a bird's-eye-view image is combined by mapping table reference section 45 using images obtained from the cameras.

In step S003, an obstacle present in the area around the bird's-eye-view image generated in step S002 is detected by obstacle detection section 42. Possible obstacle detection methods are to perform image processing using images captured by the cameras, or to use various kinds of sensors. Methods based on image processing include methods using pattern matching or stereo processing. Stereo processing includes stereo processing by means of a binocular camera and processing by means of a monocular camera. Here, monocular stereo processing will be described by way of example.

Figure 6:
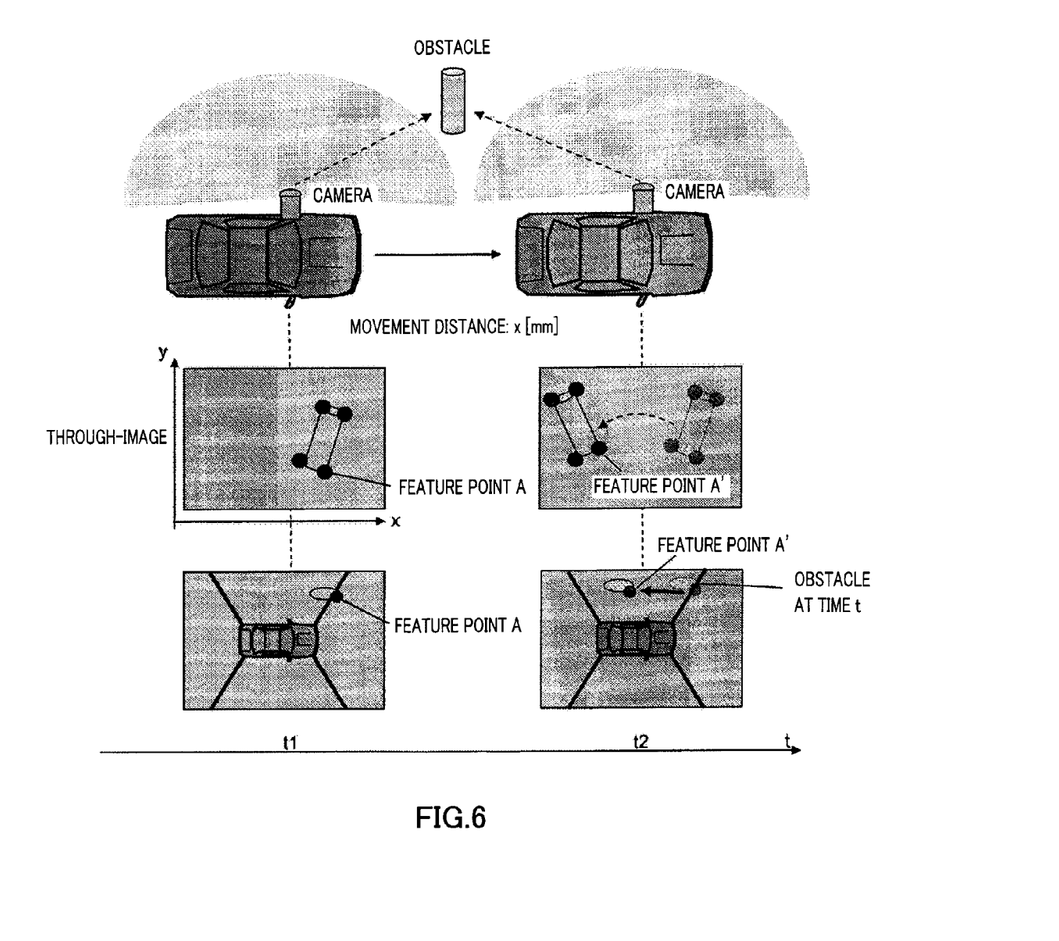
FIG. 6 is a drawing explaining an obstacle detection method of the above apparatus.

FIG. 6 is a drawing explaining the principle of monocular stereo. In the case of a monocular camera, only one image can be obtained at time t1, and therefore a second image at following time t2 is also used to find a movement amount of a feature point of the same pattern, and the distance to an obstacle is calculated from a vehicle movement amount ratio calculation. For example, if feature point A at a certain time t1 and the same feature point at time t2 are at position A', inter-pixel distance d [mm] is calculated from the inter-pixel distance [pixels] thereof and a camera parameter. This camera parameter is a parameter set at the time of camera lens design. Also, with regard to the feature point calculation method, an edge point, corner, or the like, such as constituting a feature of an object is used, and feature point detection is performed, for example, by means of generally known corner detection filtering processing, an edge detection filter, or the like. From the above information, distance D to an obstacle desired to be found can be calculated as shown below from camera focal length f, inter-pixel distance d, and vehicle movement distance x.

$$D = f \times x / d$$

In step S004, it is determined whether or not the object detection result is that an obstacle is present within a bird's-eye-view image (an area where two camera images overlap). If it is determined that there is an obstacle within this area, obstacle detection section 42 proceeds to the next step. If it is determined that there is no obstacle, the processing is terminated.

In step S005, position information in a camera image for each obstacle obtained by obstacle detection section 42 is acquired. Here, coordinates are acquired from a feature point of an obstacle detected in step S003.

Figure 7:
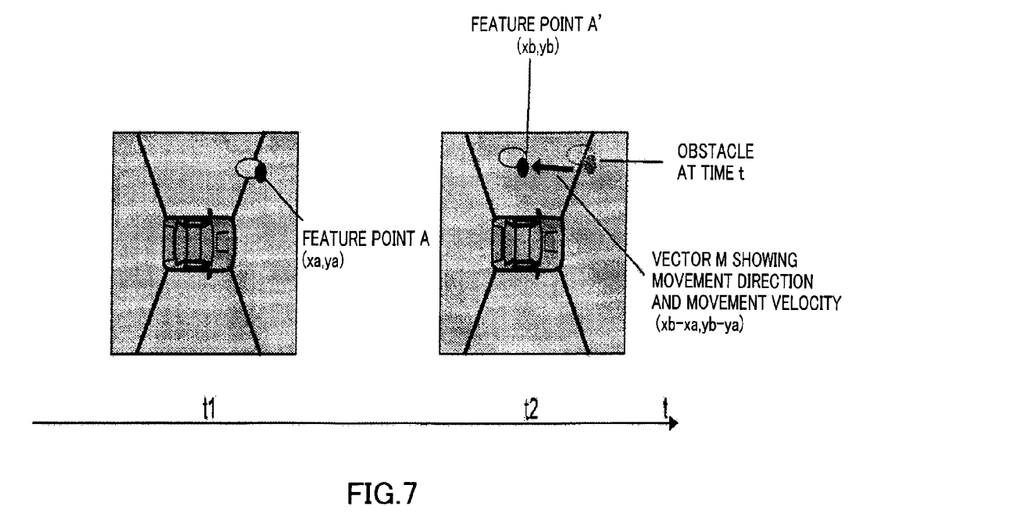
FIG. 7 is a drawing explaining an obstacle movement direction and movement velocity calculation method of the above apparatus.

In step S006, obstacle movement direction prediction section 43 uses a feature point calculated in step S003 to calculate a movement direction and movement velocity of an obstacle. As shown in FIG. 7, a feature point movement direction M vector (xb−xa,yb−ya) is detected from time-series feature points, feature point A (xa,ya) at a certain time t and feature point A' (xb,yb) at the next time t+1. Also, movement velocity VM is calculated from detected feature point movement vector M. As the calculation method, a movement distance and movement time are calculated from the Euclidian distance between feature point coordinates A at time t and feature point A' at time t+1 detected in a bird's-eye-view image and a per-pixel distance at the time of conversion into a bird's-eye-view image as a parameter, and movement velocity is calculated as shown below.

$$VM = (xb-xa)^2 + (yb-ya)^2$$

Figure 8:
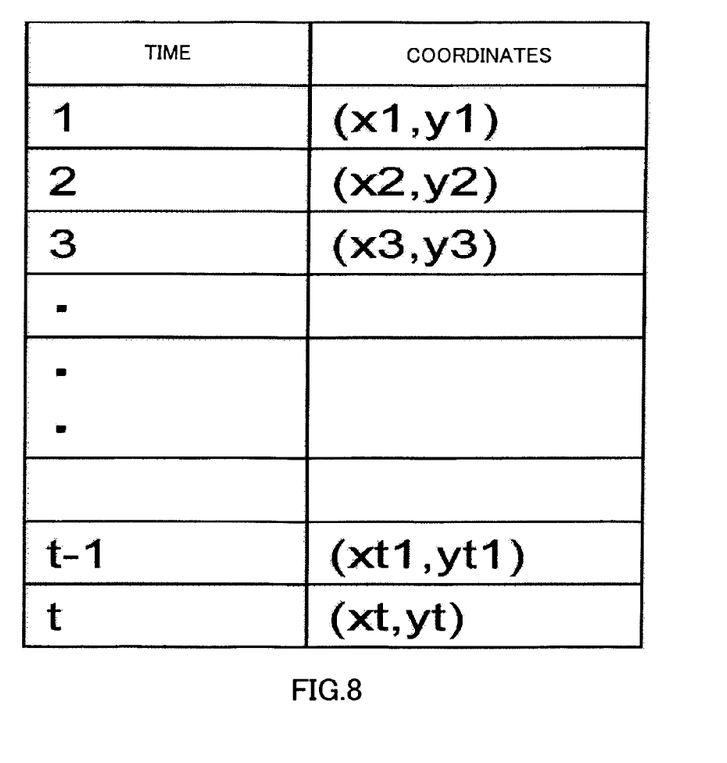
FIG. 8 is a drawing explaining an obstacle movement direction and movement velocity calculation method by means of an active sensor of the above apparatus.

An obstacle detection method using various kinds of sensors will now be described. Various kinds of sensing device 33 sensors denote, for example, active sensors such as an ultrasonic sensor or millimeter wave radar. FIG. 8 is a drawing explaining an obstacle movement direction prediction method using an active sensor. As shown in FIG. 8, detection result times and coordinates obtained from an active sensor in a time series are stored in table memory, and coordinates (xt,yt) detected at a certain time t and coordinates detected at a preceding time—for example, coordinates (xt1,yt1) at time t−1—are used to calculate obstacle movement direction M and movement velocity VM as shown below.

$$M = (xt1-xt, yt1'yt)$$

$$VM = (xt1-xt)^2 + (yt1-yt)^2$$

In the above description, at time t at which a boundary is changed, an obstacle movement direction and movement velocity are calculated using a detection result of immediately preceding detection time t−1, but in order to improve precision, a movement direction and movement velocity may also be calculated by averaging a plurality of data detected in the past. Also, considering a movement direction and movement velocity of a moving obstacle, which position an obstacle will reach in a frame to be updated may be predicted, and if there is no difference between the result of this prediction and the position of a moving obstacle detected from the current frame, the obstacle can be considered to be moving in that movement direction and at that movement velocity as they are, and a boundary line can be changed so as not to fall upon a moving obstacle. If there should be a difference between the prediction result and the position of a moving obstacle detected from the current frame, the boundary line is changed, as described above, so as not to fall upon a possible obstacle movement position described in FIG. 3—that is, movement radius r constituting a possible obstacle movement position. In this way, boundary line movement can be performed that takes the movement direction and velocity of a moving obstacle into consideration more accurately.

Figure 9:
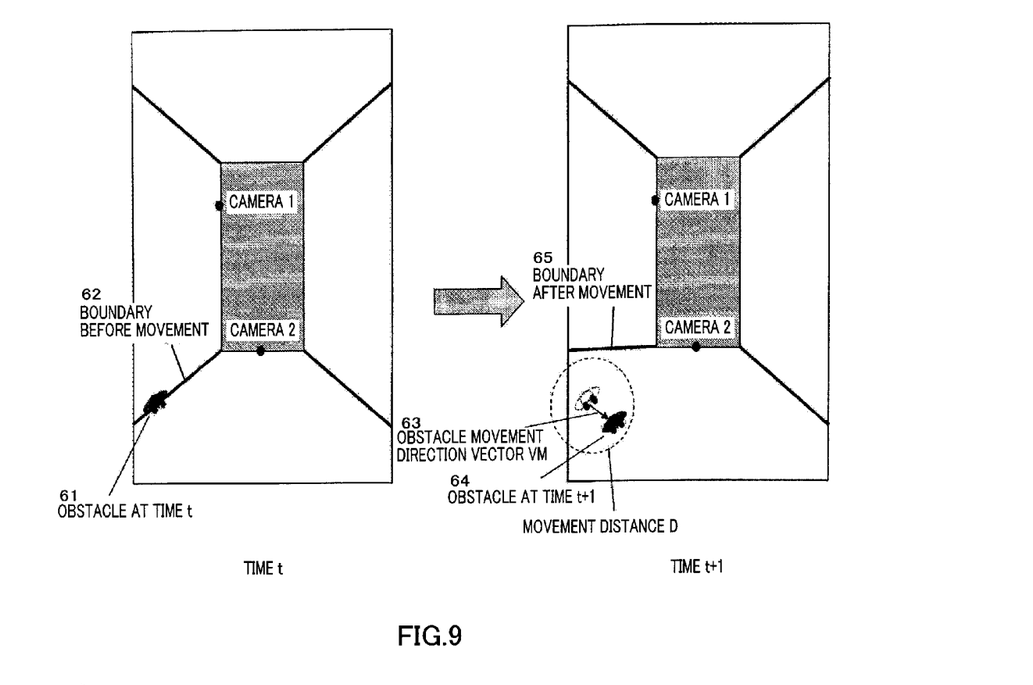
FIG. 9 is a drawing explaining a partial image boundary changing method of the above apparatus.

In step S007, obstacle movement direction prediction section 43 changes a boundary so as not to overlap an obstacle based on the obstacle movement direction and movement velocity calculated in step S006. Specifically, as shown in FIG. 9, a change is made in a direction opposite to obstacle movement direction 63, and to a position such that boundary 65 and obstacle 64 do not overlap at the next image frame update timing. If the obstacle movement velocity calculated above is designated VM and the screen update time is designated t, movement distance D can be calculated as shown below.

$$D = VM \times t$$

That is to say, a boundary change should be performed such that a changed boundary does not overlap a relevant detected obstacle, and by a distance greater than movement distance D in the opposite direction to obstacle movement direction vector VM 63. A changed boundary has been described at a position in the opposite direction to a moving obstacle, but a boundary change may also be performed in the same direction as a moving obstacle, and by a distance greater than obstacle movement distance D at the next image frame update timing.

Figure 10:
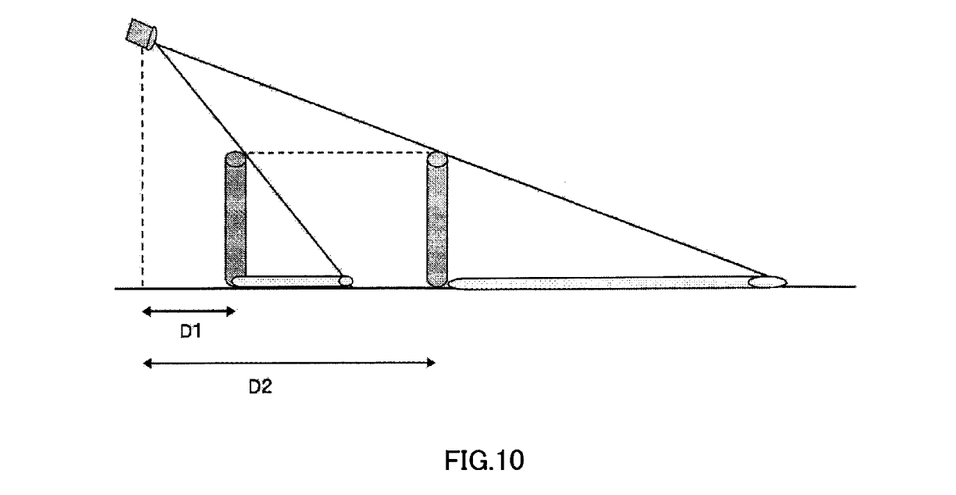
FIG. 10 is a drawing explaining foreshortening of an obstacle on a bird's-eye-view image of the above apparatus.
Figure 11:
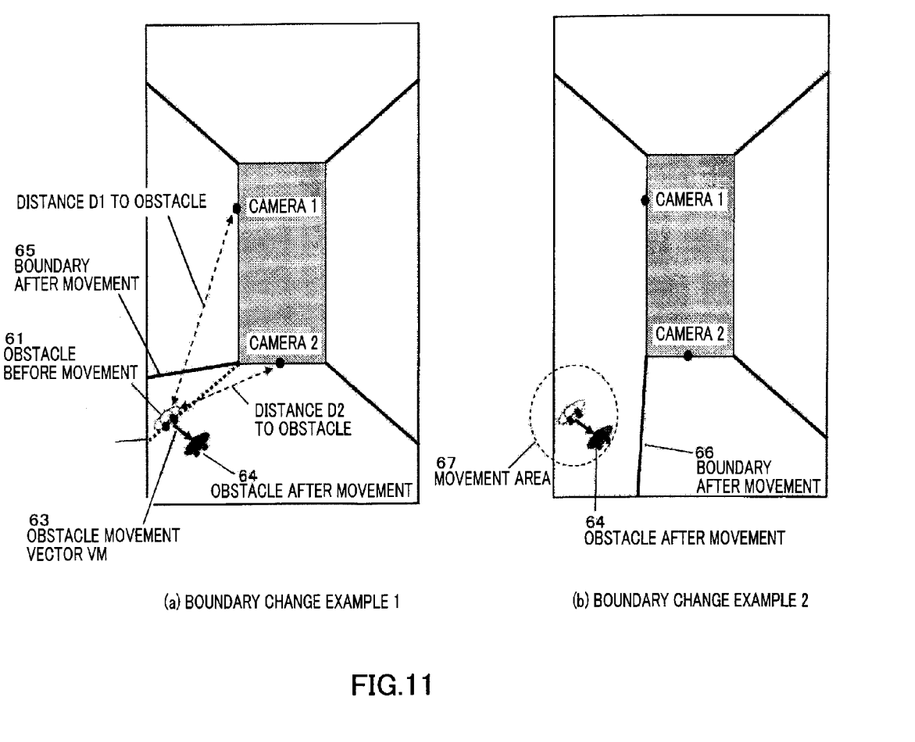
FIG. 11 is a drawing explaining a partial image boundary changing method of the above apparatus.

This boundary changing method is decided by the distance between an obstacle and a camera that images the obstacle. FIG. 10 is a drawing explaining the relationship between an obstacle and a camera position. When the heights of obstacles are the same, as in FIG. 10, the shorter the distance from a camera, the smaller is the foreshortening of an obstacle in a bird's-eye-view image. This shows how obstacles are displayed in a bird's-eye-view image, and since foreshortening in a bird's-eye-view image is smaller for a shorter distance between an obstacle and a camera, the image is easier to view for a user. From the above, as a boundary changing method, it is desirable, for example, to calculate distances between an obstacle and camera 1 and camera 2 capable of imaging that obstacle, and perform a boundary change such that an image captured by the nearer camera is used. In the example shown in FIG. 11, if camera 1 coordinates are (xc1,yc1), camera 2 coordinates are (xc2,yc2), and obstacle coordinates are (xo, yo), the respective distances can be calculated as shown below.

$$D1=(xc1-xo)^2+(yc1-yo)^2$$

$$D2=(xc2-xo)^2+(yc2-yo)^2$$

Based on the results of the above calculations, the boundary is changed such that the image of the camera with the shorter distance of D1 or D2 is used. When a boundary change is performed taking the positional relationship of cameras to an obstacle into consideration as described above, FIG. 11 (a) provides a user with better obstacle visibility.

In step S007, image combining section 41 converts the position of an obstacle into coordinates on a composite image. This processing is executed by referencing a mapping table containing the relationship between coordinates on a composite image and coordinates on each camera image.

Also, since the movement direction of an obstacle is predicted in changing a boundary, overlapping of an obstacle and a boundary can be prevented and a boundary change can be updated speedily even when an obstacle is moving. This point is explained below. In updating a boundary, there is a constraint to at least time T for screen updating. If the object detection processing time is designated TO, the screen update processing time is designated TN, and the boundary changing processing time is designated TM, total processing time T until a boundary is changed can be calculated as shown below.

$$T=TO+TN+TM$$

When an obstacle is moving, it may also be moving during above processing time T, and may be moving to a position of a boundary that changes at above processing time T. With regard to obstacle detection processing time TO, since an obstacle movement direction and movement velocity are calculated by combining image processing based recognition processing time. Tr and a past frame recognition result, if the number of past frames used is designated n, in the case of an NTSC signal, the time of one frame is 1/30 second, and therefore a time of at least (Tr+n/30) is necessary, and it is quite possible that an obstacle will move and overlap obstacle 21 that has moved to changed boundary 18 by the time of a boundary change (see FIG. 3).

However, in this embodiment, since obstacle movement direction prediction section 43 predicts the movement direction and movement velocity of an obstacle in changing a boundary, as shown in FIG. 11, an obstacle does not overlap a boundary even if moving. Specifically, with regard to a position to which obstacle 61 moves during time T, the coordinates of post-movement obstacle 64 are calculated from previously calculated obstacle movement direction and movement velocity 63. Boundary 62 needs only be changed to boundary 65 to prevent overlapping of these calculated coordinates. In this way, a boundary can be changed so as not to overlap a moving obstacle, and a boundary change is performed that takes boundary change time T into consideration, enabling a boundary change to be performed ahead of a moving obstacle rather than through tracking a moving obstacle. Also, as shown in FIG. 11 (b), in the same direction as the movement direction of obstacle 62, also, a change may be made to boundary 66 such that there is no overlap with obstacle movement position 64 in total processing time T that takes the next screen update time into consideration. Furthermore, a boundary line may be changed so as not to fall in movement area 67 on the assumption that a moving obstacle performs movement contrary to that predicted.

Figure 12:
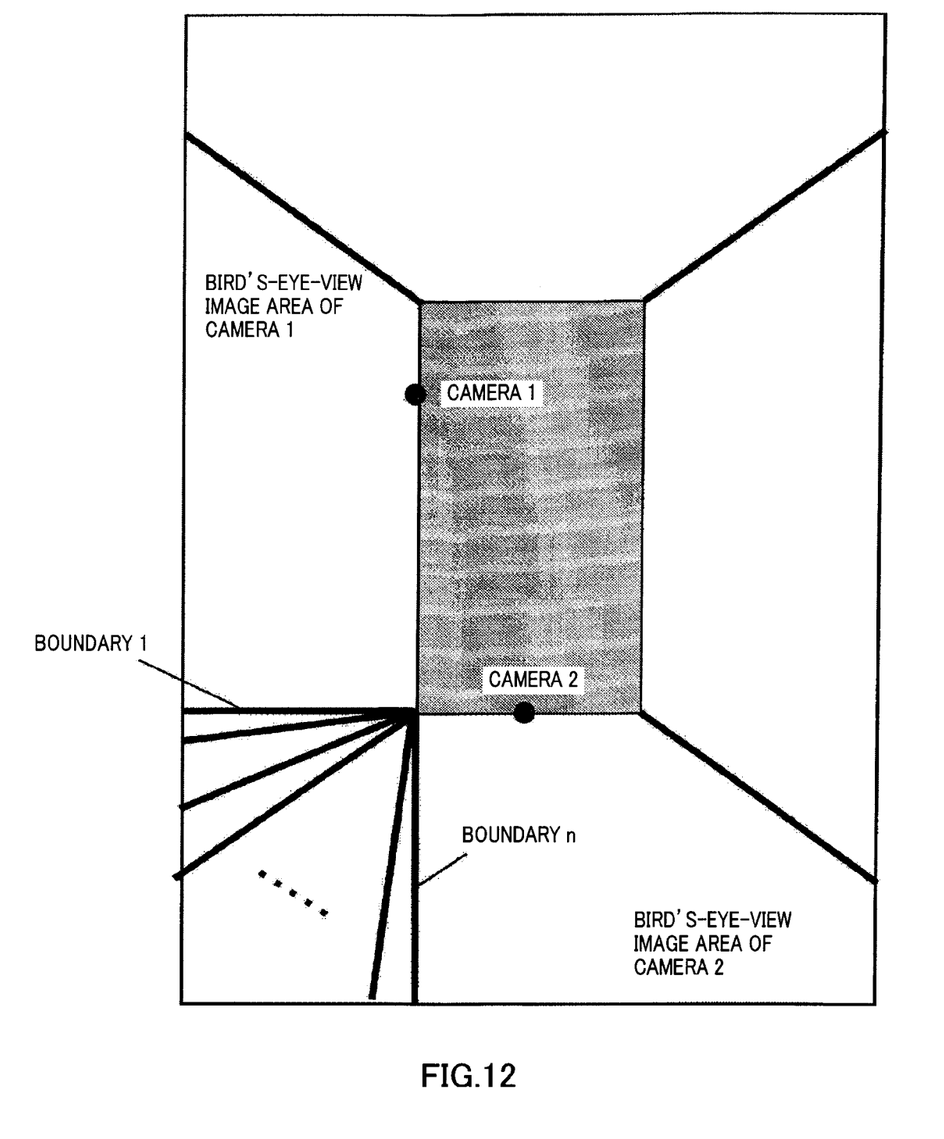
FIG. 12 is a drawing showing a partial image boundary setting example of the above apparatus.

FIG. 12 is a drawing explaining an example of a boundary setting method. With regard to an above-described boundary setting, boundary data such as shown in FIG. 12 is stored beforehand in mapping table reference section 45. Pixel combining section 41 reads boundary data from mapping table reference section 45 based on a boundary decided by obstacle movement direction prediction section 43, and combines this data. An example has been shown of a boundary drawn linearly from the edge of a vehicle in a bird's-eye-view image, but the shape of a boundary line is not limited to this example, and may be of any kind.

As described above, it no longer happens that an obstacle is displayed discontinuously due to overlapping a boundary in a boundary area of a plurality of camera images, and an obstacle can be displayed to a user more accurately and in a more easily seen manner.

(Embodiment 2)

Figure 13:
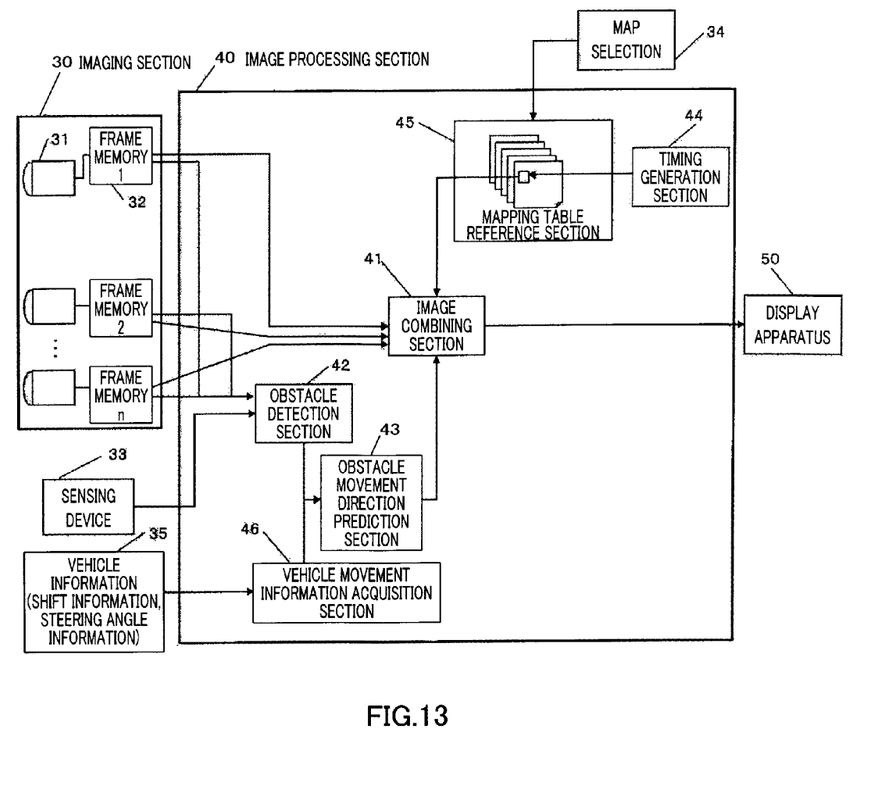
FIG. 13 is a block diagram of a driving support display apparatus according to Embodiment 2 of the present invention.

FIG. 13 is a block diagram showing a driving support display apparatus according to Embodiment 2 of the present invention. Only parts whereby the configuration differs from that in FIG. 4 are described here.

Obstacle movement direction prediction section 43 determines from an obstacle movement direction detected by obstacle detection section 42 and vehicle information 35 (shift information and steering angle information) of the vehicle movement information obtained by vehicle movement information acquisition section 46 whether or not an obstacle will enter the vehicle's path of travel from the obstacle's movement direction and movement velocity, and if such entry is predicted, obstacle movement direction prediction section 43 changes a boundary such that the obstacle and boundary do not overlap.

Operations whereby a boundary is changed based on an obstacle's movement direction and movement velocity and the vehicle's movement direction will now be described.

Figure 14:
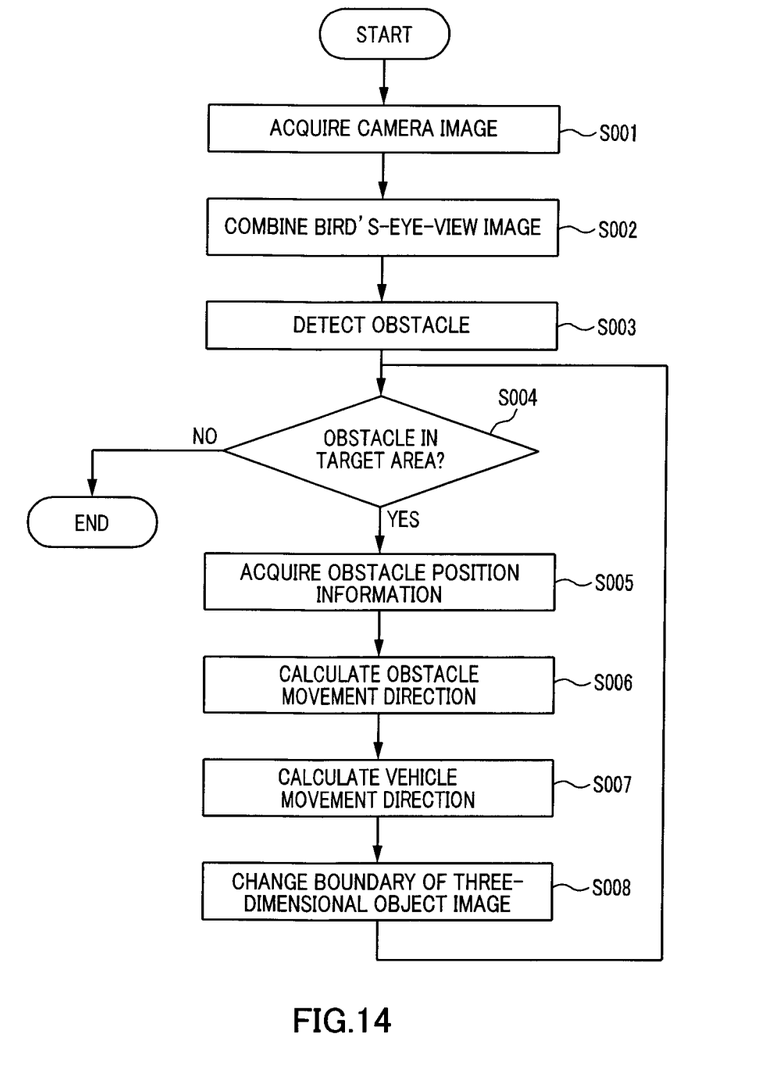
FIG. 14 is a flowchart for explaining the operation of the above apparatus.

FIG. 14 is a flowchart for explaining the operation of the driving support display apparatus. Only parts in which the operation differs from that in FIG. 5 are described here. In step S007, vehicle movement information acquisition section 46 acquires vehicle information 35 for the vehicle. Specifically, the vehicle's predetermined direction of travel is calculated by acquiring shift position and steering wheel steering angle information.

Figure 15:
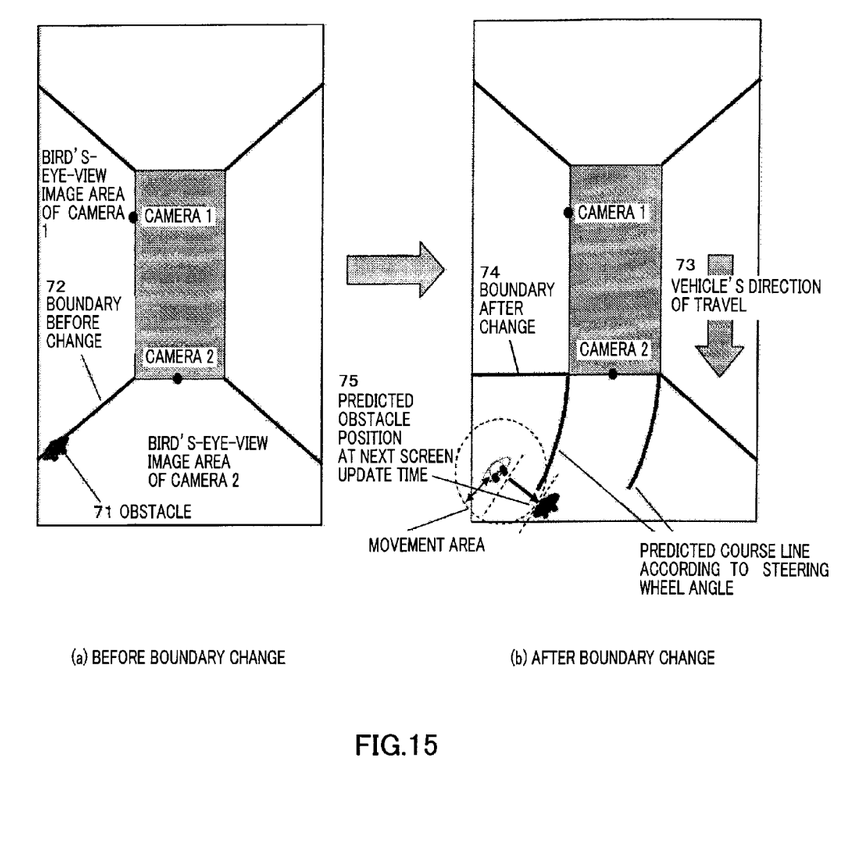
FIG. 15 is a drawing explaining a partial image boundary changing method of the above apparatus.

In step S008, obstacle movement direction prediction section 43 performs a boundary change such that an obstacle is not overlapped, based on the obstacle's movement direction and movement velocity calculated in step S007 and the vehicle's predicted direction of travel. Specifically, when obstacle 71 is in the vicinity of the vehicle's path of travel in movement direction 73, as shown in FIG. 15, a change is performed in the opposite direction to the movement direction of obstacle 71 and to a position such that obstacle 71 and the boundary do not overlap at the next image frame update timing. Specifically, if the obstacle movement velocity calculated above is designated VM and the screen update time is designated t, movement distance D can be calculated as shown below.

$$D=VM \times t$$

That is to say, detected relevant obstacle 71 should be changed to boundary 74 to be in the opposite direction to the obstacle's movement direction and such that predicted obstacle position 75 at the time of the next screen update and the boundary after the change do not overlap. A boundary that is changed has been described at a position in the opposite direction to a moving obstacle, but a boundary change may also be performed in the same direction as the movement direction of a moving obstacle and such that predicted obstacle position 75 predicted at the next image frame update timing is not overlapped.

Making a decision according to the distance between an obstacle and a camera that images the obstacle in this boundary changing method is as described above.

Also, as explained earlier, a boundary line may be changed so as not to fall in a movement area on the assumption that a moving obstacle performs movement contrary to that predicted.

By means of such above-described operations, a driving support display apparatus of the present invention, when performing bird's-eye-view image composition processing by means of a plurality of cameras, can prevent a partial image boundary and an obstacle from overlapping, and can provide information on the area around a vehicle to a driver accurately, and support safer driving.

The above description has covered an example in which boundary changing is performed in the event of obstacle detection such that there are no obstacles overlapping any boundary, and an example in which the movement direction of the vehicle is taken into consideration and a boundary change is performed for an obstacle present in the direction in which the vehicle is moving, but the present invention is not limited to these methods, and boundary changing may also be performed such that a boundary is not overlapped taking an obstacle overlapping a boundary or an obstacle nearest the vehicle as an object. Also, these may be combined, and boundary changing may be performed in the predicted direction of travel of the vehicle and so that overlapping is not performed for the obstacle nearest the vehicle.

The disclosure of Japanese Patent Application No. 2009-218445, filed on Sep. 24, 2009, including the specification, drawings and abstract, is incorporated herein by reference in its entirety.

INDUSTRIAL APPLICABILITY

As described above, the present invention is suitable for use as a driving support display apparatus using a plurality of cameras that image the area around a vehicle, wherein boundary changing is performed such that an obstacle in the vicinity of a boundary between partial images is not overlapped by a combined boundary, and therefore the obstacle does not disappear, and a user can be provided with an image that is accurate and easy to understand:

REFERENCE SIGNS LIST

30 Imaging section
31 Camera
41 Image combining section
42 Obstacle detection section
43 Obstacle movement direction prediction section
46 Vehicle movement information acquisition section

The invention claimed is:

1. A driving support display apparatus comprising:
    an image combining section that combines images of a plurality of cameras and generates a bird's-eye-view image;
    an obstacle detection section that detects an obstacle in the vicinity of a vehicle; and
    a prediction section that predicts a movement direction and movement velocity of an obstacle on the basis of detection by the obstacle detection section, and sets a boundary of images of the plurality of cameras so as not to overlap an obstacle on the basis of a prediction results,
    wherein the image combining section creates a bird's-eye-view image in which an obstacle and a boundary of images of the plurality of cameras do not overlap based on information from the prediction section, and
    the prediction section sets the boundary so as not to enter within a movement radius that is a position to which there is a possibility of movement of the obstacle.

2. The driving support display apparatus according to claim 1, further comprising an acquisition section that acquires vehicle information that includes at least one of shift information and steering angle information of the vehicle,
    wherein the prediction section sets the boundary so as not to overlap the obstacle, based on the movement direction and the movement velocity, and the vehicle information.

3. The driving support display apparatus according to claim 2, wherein the prediction section sets the boundary so as not to enter an area in which there is a possibility of movement of the obstacle.

\* \* \* \* \*